United States Patent Office 3,309,847
Patented Mar. 21, 1967

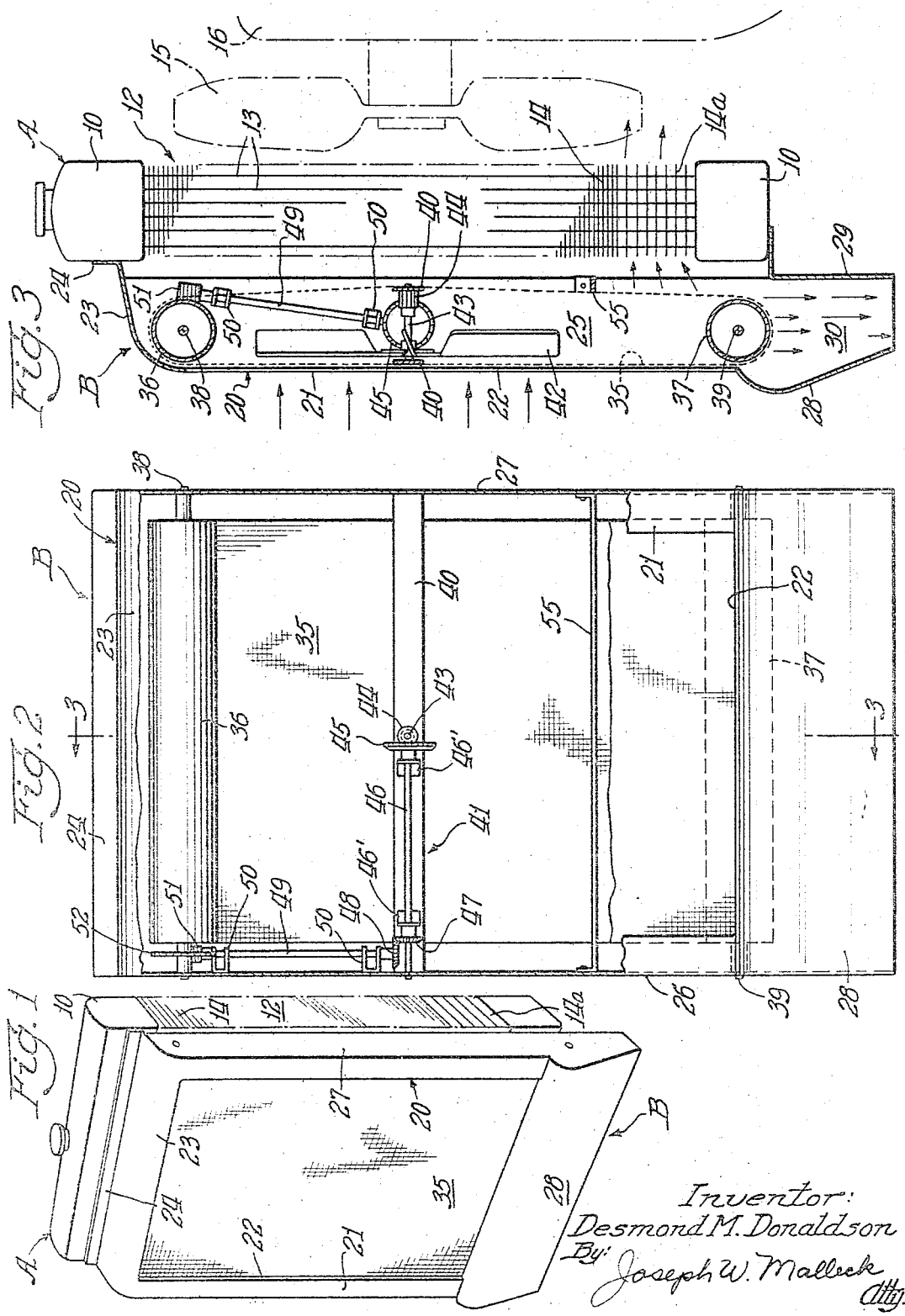

3,309,847
FILTERING MEANS FOR A HEAT EXCHANGER
Desmond M. Donaldson, Halton, Ontario, Canada, assignor to Borg-Warner Corporation, Chicago, Ill., a corporation of Illinois
Continuation of abandoned application Ser. No. 98,452, Mar. 27, 1961. This application Sept. 23, 1964, Ser. No. 403,425
1 Claim. (Cl. 55—268)

This is a continuation of application Ser. No. 98,452, filed Mar. 27, 1961, and now abandoned.

This invention relates to a heat exchanging device and more particularly to filtering means provided for such a device to remove particles from an air stream with which the device is supplied.

In instances where the available atmosphere or surrounding air is used as a heat exchanging medium, such as with a cooling radiator for automotive vehicles, it is not only preferable but necessary that such air be free of foreign particles which have a tendency to collect on the radiator fins thereby substantially reducing the efficiency of the device. Some vehicle radiators could be designed with widely spaced fins to pass any air borne dust or particles but this would result in a severe loss in heat exchanging efficiency if done extensively. Certain automotive vehicles, notably agricultural machines such combines, swathers and other harvesting equipment, are used in an environment where the air is so laden with dust and chaff that it is imperative to provide some means of extracting this foreign material from the air supply so that the radiator cannot become clogged and rendered ineffective. The acuteness of the problem for agricultural vehicles can well be appreciated when it is considered that the vehicles are usually slow moving and easily enveloped within clouds of chaff and dust generated by the machine operation. There is no immediate clean supply of air about the machine which can be drawn upon for use with the radiator.

Heretofore, devices employed to cleanse the surrounding air for agricultural vehicles have not proved entirely satisfactory.

Known devices have included use of perforated metal screens placed high up in the air relative to the vehicle so as to draw air as clean as possible; this required use of an extended intake tower in order to locate the metal screen at a high elevation. In another device, oscillating dampers are used in conjunction with a box-type chaff screen; the damper moves to alter from one side to the other of the air stream and thereby relieve pressure first on one side of the screen and then on the opposite side, allowing accumulative chaff to drop off. Another device employs large diameter rotating drums of perforated metal which use centrifugal force to drive the chaff out of the air stream passing through the drums; this device has proved rather disadvantageous since the drums have functioned as a fan to counteract the air stream. Still another device uses a variable pitch radiator fan which can be periodically reversed to blow air back through the radiator core and thereby release accumulated chaff from the front side of a perforated screen ahead of the radiator; this design is disadvantageous because of its expense and difficult engineering problem. And lastly, there is a device having a rotating wiper blade which is used much in the manner of a windshield wiper, to scrape the chaff from the front of a circular perforated metal screen; this device is objectionable because of high cost and the development of static electricity which tends to make the removal chaff most difficult.

The above devices all fail to provide a simple economical and effective self-cleaning filtering means which does the job with little maintenance. To meet these needs, applicant has provided a flexible foraminous belt which is adapted to be interposed within the air current having certain portions thereof within the air stream and other portions without at any one time. Such belt is carried by a pair of rotating cylindrical drums driven by a propeller actuated by the oncoming air current.

A primary object of this invention is to provide a heat exchanger construction having new and improved means for filtering air supplied thereto.

Another object is to provide a heat exchanging device having filtering means which is self-cleaning and is capable of accomplishing the self-cleaning operation even under excessively chaff-polluted air supply conditions.

Another object is to provide air supply filtering means in a heat exchanger which is economical, simply constructed and operably driven by the air supply for the heat exchanger.

Still another object is to provide a filtering means for a heat exchanger having a continuous rotating foraminous belt with portions thereof which are alternately subjected to the air supply and then to a reduced pressure area where chaff may fall off.

Yet another object is to provide a filtering means having a continuous rotating foraminous belt which is not only self-cleansed by portions thereof being subjected to differential pressure areas, but also by means which reverse the face of the belt to suck out remaining clogged particles, the heat exchanging device being equipped with locally spaced fins to accommodate passage of particles so removed.

Other objects and features of the invention will be readily apparent to those skilled in the art from the specification and appended drawings illustrating certain preferred embodiments in which:

FIG. 1 is a perspective view of a heat exchanger adapted for use in an agricultural vehicle and having a filtering means embodying this invention;

FIG. 2 is a front elevational view of the filtering means having portions thereof broken away; and FIG. 3 is a sectional view taken substantially along line 3—3 of FIG. 2 and illustrating a cooling fan drivingly connected to the engine of the agricultural vehicle.

Turning now more particularly to the drawings there is shown in FIGS. 1 and 3 a preferred embodiment of this invention.

A cooling radiator or heat exchanger device A for an agricultural vehicle (not shown) has a filtering mechanism B attached to the front thereof. The heat exchanger device comprises upper and lower fluid headers 10 interconnected by a fin matrix 12 having a plurality of fluid conduits 13 extending between the headers and carrying a series of horizontal heat exchanging fins 14 closely spaced apart substantially throughout the height of the matrix. Near the bottom extent of the matrix the fins 14a are spaced much further for a purpose to be hereinafter explained. The operation of the heat exchanger is similar to what is well known in the art wherein a supply of cooling air drawn through the matrix 12 by conventional fan 15 drivingly mounted on an engine 16. The air absorbs heat dissipated by the fins from fluid contained in the fluid conduits and headers.

The filtering means B which is attached to the front of the heat exchanger extends across the front of the entrance to the matrix to remove chaff and other foreign particles present in the incoming air supply (indicated by the arrows in FIG. 3). The filtering means comprises a housing 20 formed with a front wall 21 having a rectangular aperture 22 defining an air inlet. The front wall 21 has an inwardly extending flange 23 at its upper end with a lip 24 attached to radiator header 10; the flange 23 spaces the front wall from the matrix 12 to define a chamber 25 in conjunction with side panels 26 and 27 which communicates directly with the fins of the radiator.

The bottom extent of the housing wall 21 has a curved portion 28 extending downwardly and in conjunction with a depending wall member 29 attached to the bottom of radiator header 11 and the side panels 26 and 27, a low pressure chamber 30 is formed.

To remove chaff and other particles from the incoming air supply, a flexible foraminous belt 35 is carried by a pair of cylindrical drums 36 and 37, rotatably supported on shafts 38 and 39 respectively carried by the housing side panels. The belt may be constructed of perforated rubber material, suitable plastic, paper, screen or wire cloth, and is formed as a continuous loop so that it may tightly embrace the outer peripheries of both drums and thereby cause any one portion of the belt to move in a circuitous path upon drivingly rotating one of the drums. The belt is guided in its path by guide bars 40.

A driving means 41 is provided to turn the upper drum 36 for moving the belt; the means 40 comprises a fan 42 drivingly mounted on shaft 43 supported on the guide bars and rotatably driven by the oncoming air supply. A transmission interconnects the fan and the drum 36 and includes a splined sleeve 44 on shaft 43 in mesh with a ring gear 45 carried on one end of a horizontally disposed shaft 46 rotatably supported on brackets 47. The other end of shaft 46 carries a bevel spur gear 47 in mesh with a bevel spur gear 48 on one end of shaft 49 disposed generally upright and supported by U-brackets 50. The opposite end of shaft 49 carries a worm gear 51 in mesh with a worm wheel 52 fixedly mounted on the shaft 38 of the drum 36.

A scraper bar 55 is mounted between the side panels of the housing and removes obstinate chaff as hereinafter described.

In operation, the engine fan 15 draws a supply of air through the inlet of filter means B to enter the matrix of radiator A. The oncoming air drives fan 42 which in turn rotates drum 36 through the interconnecting transmission. The flexible foraminous belt is caused to move so that any one portion travels a cycle wherein it moves downwardly across the unfiltered air supply, around the outer periphery of drum 37, back across the filtered air stream and then around the periphery of drum 36.

Chaff particles filtered by the belt and forced to cling to its outer surface by the pressure of the air stream are removed from any portion thereof in a shelf-cleaning sequence when the portion moves about the periphery of drum 37 and enters chamber 30. Chamber 30, being out of the direct stream of air is lower in pressure and permits the chaff particles to drop freely as indicated by the arrows in chamber 30 in FIG. 3. Chaff is further removed by flexure of the belt when portions thereof move about the drums.

Another aid to removal of obstinate chaff which has failed to be removed by the above features, is sucked off the outer surface of the belt when the belt portion moves back across the filtered air stream and this time with its face reversed. The particles which are sucked off are removed to be disposed by passing between the widely separated fins 14a and eliminated. As an additional aid, the scraper bar 55 co-operates to scrape particles from the belt surface at any convenient location.

The above construction provides a simple, economical filtering means for a heat exchanger that has superior self-cleaning characteristics.

While I have described my invention in connection with certain specific construction and arrangements, it is to be understood that this is by way of illustration and not by way of limitation and the scope of my invention is defined solely by the appended claim which should be construed as broadly as the prior art will permit.

I claim:

In a heat exchanger of the vehicle-type including an engine fan for moving a stream of air through said heat exchanger, a self-cleaning filtering device for removing particles from said stream of air comprising: a housing having an opening therethrough connected to said heat exchanger, said opening defining an area substantially equivalent to the frontal area of said heat exchanger, said housing defining a first chamber and a second chamber therein, said first chamber being in alignment with said opening, said second chamber being a low pressure chamber located remote from said opening, rotatable means including a pair of spaced apart drums and a flexible foraminous belt carried by said spaced apart drums, said rotatable means being positioned within said housing whereby rotation thereof is effective to move a portion of said belt through said first chamber in confronting relationship with said stream of air whereby said foraminous belt in combination with said driven stream of air is effective to filter particles from said driven stream of air and thence to move said portion of said foraminous belt into said second chamber whereby said portion of said foraminous belt is remote said opening and is remote said driven stream of air and whereby said particles are free to fall from said portion of said foraminous belt, and driving means positioned within said housing driven by said stream of air, said driving means being connected to said rotatable means and being effective to rotate said rotatable means.

References Cited by the Examiner

UNITED STATES PATENTS

| 1,589,766 | 6/1926 | Schreiber | 253—38 |
| 1,814,428 | 7/1931 | Bishop | 55—351 |
| 1,860,697 | 5/1932 | Traviss | 55—404 X |
| 2,455,734 | 12/1948 | Clausen | 165—98 X |
| 2,639,780 | 5/1953 | Hardy | 55—351 |
| 2,752,003 | 6/1956 | Hersey et al. | 55—354 X |
| 2,854,086 | 9/1958 | Schmidt | 165—95 X |
| 3,002,585 | 10/1961 | Pasturczak | 55—290 |

FOREIGN PATENTS

| 553,540 | 2/1923 | France. |
| 507,518 | 9/1930 | Germany. |

FRANK W. LUTTER, *Primary Examiner.*

ROBERT F. BURNETT, *Examiner.*

D. K. DENENBERG, *Assistant Examiner.*